Dec. 16, 1924.
F. H. SIMMONS
1,519,639
ATTACHMENT FOR WELDING TORCHES
Filed Aug. 14, 1923
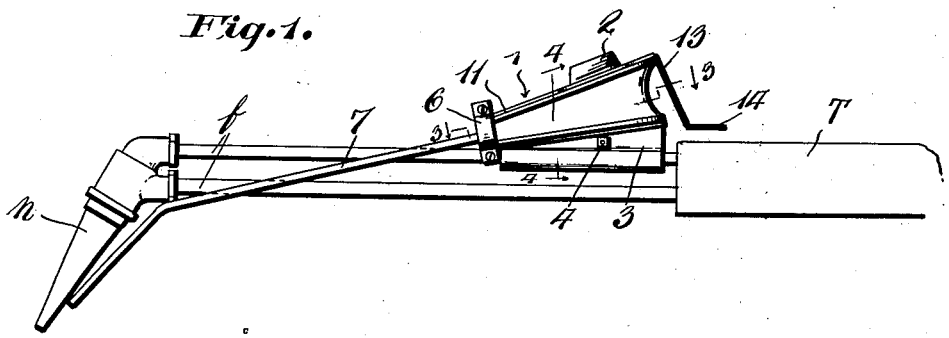
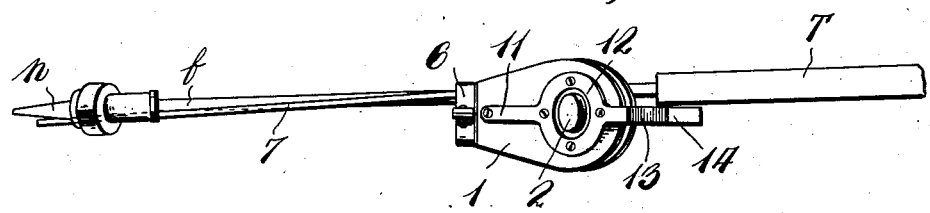
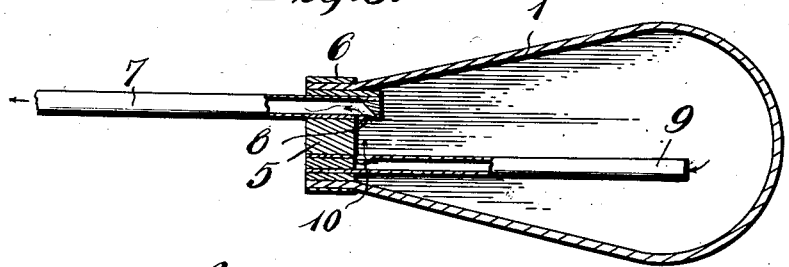
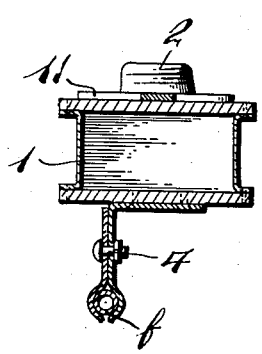
Inventor
Fred H. Simmons
By
Attorney Patented Dec. 16, 1924.

1,519,639

UNITED STATES PATENT OFFICE.

FRED H. SIMMONS, OF HANNIBAL, MISSOURI.

ATTACHMENT FOR WELDING TORCHES.

Application filed August 14, 1923. Serial No. 657,415.

*To all whom it may concern:*

Be it known that I, FRED H. SIMMONS, a citizen of the United States of America, residing at Hannibal, in the county of Marion and State of Missouri, have invented certain new and useful Improvements in Attachments for Welding Torches; and I do hereby declare that the following is a full, clear, concise, and exact description of the invention, such as will enable others skilled in the art to which it appertains to make and use the same.

This invention relates to improvements in attachments for welding torches, having for an object to provide a novel form of device for feeding or supplying a suitable flux to that metal employed during a welding operation, such flux being discharged onto the welding metal from a point in proximity to the burner nozzle of the torch and being attached thereto and capable of operation from the handle of said torch, thus avoiding the inconvenience of handling a separate or second article and rendering it practical to operate the same simultaneously with operation of the torch.

It is likewise an object of the invention to provide a flux feeding attachment of the character mentioned wherein a predetermined amount of the flux will be discharged onto the welding metal and also, that flux retained in the same will be prevented from caking adjacent the outlet to such an extent as to prevent further free feeding of the flux therefrom.

Other objects will be in part obvious and in part pointed out hereinafter.

In order that the invention and its mode of operation may be readily understood by persons skilled in the art, I have in t accompanying illustrative drawings, and in the detailed following description based thereon, set out one possible embodiment of the same.

In these drawings:

Figure 1 is a side elevation of the attachment positioned upon a form of welding torch;

Figure 2 is a top plan view thereof;

Figure 3 is an enlarged fragmentary detail in longitudinal section through a portion of the attachment taken on the line 3—3 of Figure 1 looking in the direction in which the arrows point; and, Figure 4 is a similar section taken on the line 4—4 of Figure 1 looking in the direction in which the arrows point.

Having more particular reference to the drawings, in connection with which like characters of reference will designate corresponding parts throughout, the improved flux feeding attachment is adapted to be arranged upon various forms of welding torches now commonly used in the art, one thereof being shown herein and generally indicated by the reference character T; a burner nozzle $n$ being arranged at one end of the torch for an obvious purpose and being supplied with the usual oxygen and acetylene feed pipes $f$.

The invention may be stated to comprise a bellows receptacle 1 having a filling opening formed in the upper sides thereof which is normally closed by means of an internally screw threaded closure cap 2; a clamping bracket 3 being secured to the under side and longitudinally of the bellows receptacle 1, as shown in the Figures 1 and 4, whereby the same may be fixedly secured to and positioned upon one of the feed pipes $f$ or other suitable portion of the torch T, a clamping bolt 4 passing through the separable portions of the clamping bracket, as shown in the Figure 4, and serving as means for effecting positive and fixed adjustment of the clamping bracket 3 with said pipe $f$. In this connection, it is to be noted that the upper side of the clamping bracket 3 is forwardly inclined and in consequence, will accordingly position the bellows receptacle 1 in a forwardly inclined position so that the flux, usually in form of a powder, contained within the receptacle 1, will normally remain adjacent the outlet end of the bellows receptacle and when desired, may be readily discharged therefrom.

An end wall 5 is arranged within the reduced or constricted lower end of the bellows receptacle 1, being secured in position with respect to the same by means of a metal strap 6 passing thereabout and clearly shown in the Figures 1 and 2. One end of an elongated tube 7 is snugly received in an opening formed in the end wall 5 and has a laterally opening inlet port 8 formed therein, said tube extending forwardly and downwardly to a position in proximity to the burner nozzle $n$, whereat it is bent obliquely with relation to the body of the tube and has its outer end disposed in proximity to the discharge end of the burner nozzle n.

To effect the discharge of the powdered flux from the bellows receptacle 1 with compression of the latter and also, to ensure the discharge of a sufficient but predetermined quantity of the powdered flux from such bellows receptacle, a short tube 9 is arranged within and longitudinally of the bellows receptacle, having one end thereof embedded in the end wall 5 as shown in the Figure 3, while a laterally opening air discharge port 10 is formed in that portion of the same directly adjacent the inner side of said wall 5; the remaining or outer end of the tube being open and positioned in proximity to the rearward or upper end of the receptacle 1. Thus, with compression of the bellows receptacle 1, the air compressed therein will be caused to enter the open outer or upper end of the tube 9 and to flow through such tube and from the same by way of the port 10, whereat it will cause a portion of the powdered flux within the bellows receptacle to be forced into the tube 7 by way of the outlet port 8 in the inner end of the same. Hence, a predetermined quantity of the powdered flux will be discharged from the outer or lower end of the feeding or supply tube 7 onto the welding metal at a point directly in proximity to the welding flame emitted from such nozzle.

Because of the forwardly inclined positioning of the bellows receptacle 1 and the flux feeding tube 7, it will be understood that the powdered flux will be effectually discharged from the open or lower end of said tube 7 and likewise, that that flux contained within the bellows receptacle 1 will be normally arranged adjacent the constricted end thereof in order that the air discharged from the port 10 of the short tube 9 will have positive engagement therewith upon compression or operation of the bellows.

When the supply of flux within the bellows receptacle 1 is exhausted, the cap 2 may be readily removed from the filling opening and the supply then replenished, whereupon the cap is replaced.

From the foregoing, it will be seen that I have provided a simple but effectual form of flux feeding or supply means for welding torches and furthermore, a device which will materially facilitate proper admixture of the flux with the welding metal. Heretofore, it has been the usual custom to dip the welding metal, iron, or the like that is to be melted in the welding operation, into the particular flux employed. In this welding operation, colored glasses are usually employed to protect the eyes from the intense brilliancy of the welding flame produced by the torch, thereby making it difficult to see the flux upon the welding metal and in consequence, frequently causing faulty welding. With my device, a proper amount of flux may be at all times delivered to the welding metal at a point directly adjacent the welding flame merely by actuating the bellows receptacle 1, compressing air therein and causing such air to force a predetermined quantity of the powdered flux therefrom by way of the feeding or supply tube 7 onto the desired portion of the welding metal. To facilitate operation, that is, flexing of the bellows 1 whereby to compress air within the same and to effect the discharge of the powdered flux therefrom, I may and preferably do arrange an arm 11 upon the upper side of the bellows receptacle 1, as shown in the Figure 2, extending said arm longitudinally of said upper side of the bellows and forming a loop 12 therein, which loop receives or encircles the closure cap 2, while the outer or extended portion of said arm is bent downwardly at substantially right angles to the body portion of the arm 11, as indicated at 13 and is then formed with a laterally extending thumb or finger piece 14 overlying and arranged directly adjacent to the handle of the torch T. Thus, it will be understood that a user of the torch T need only to extend his thumb into engagement with the piece 14 and to depress the same for compressing the bellows receptacle 1, whereby to effect discharge of a quantity of the powdered flux therefrom. Because of this, it will be understood that the welding and flux feeding operation will be combined and that the necessity of a separate operation for supplying or feeding flux to the welding metal will be eliminated.

Manifestly, the construction shown is capable of considerable modification and such modification as is within the scope of my claims, I consider within the spirit of my invention.

I claim:

1. A flux feeding attachment for welding torches comprising bellows immovably positioned upon an adjacent portion of the torch beyond the burner nozzle thereof, said bellows having a normally closed filling opening therein, a tube extending from one end of the bellows into proximity to the burner nozzle, and a ported tube arranged within and disposed longitudinally of a portion of said bellows adapted to deliver a measured quantity of flux to said tube.

2. A flux feeding device for welding torches comprising a compressible pneumatic flux retaining and feeding device, a tube extending from one end of said device into proximity to the burner nozzle of the torch, and a ported tube arranged within and disposed longitudinally of said device adapted to direct a measured quantity of flux to said tube.

3. A flux-feeding attachment for welding torches comprising a compressible collapsible flux retaining and feeding device, a feeding tube extending from one end of said device into proximity to the burner nozzle of the torch, a ported tube arranged within and disposed longitudinally of a portion of said device adapted to deliver a measured quantity of flux to said tube, at times, and an arm secured to said device and extended from one side of the same into proximity to the handle of said torch for facilitating operation of such device.

4. A flux feeding device for welding torches comprising a bellows receptacle for containing the flux, means for fixedly supporting said receptacle in an inclined position upon a portion of said torch, a feeding tube extending from the lower end of said bellows receptacle into proximity to the burner nozzle of said torch, and an arm secured to and extended from one side of said bellows receptacle into proximity to the handle of said torch for facilitating operation of the bellows, as and for the purpose set forth.

5. A flux feeding device for welding torches comprising a bellows receptacle fixedly supported in an inclined position upon a portion of said torch, a feeding tube extending from the lower end of said bellows receptacle into proximity to the burner nozzle of said torch, a short tube arranged within and extended longitudinally of the bellows receptacle having its outer end open and a laterally opening air discharge port therein adjacent the lower end of the bellows and in proximity to the inner end of said feeding tube, and an arm secured to the upper side of said bellows and bent upon itself to form a finger engaging piece in proximity to the handle of said torch, as and for the purpose set forth.

In witness whereof I have hereunto set my hand.

FRED H. SIMMONS.